United States Patent
Kinoshita

(10) Patent No.: US 11,223,224 B2
(45) Date of Patent: Jan. 11, 2022

(54) VEHICLE ELECTRIC POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 95 days.

(21) Appl. No.: 16/241,659

(22) Filed: Jan. 7, 2019

(65) Prior Publication Data
US 2019/0305581 A1    Oct. 3, 2019

(30) Foreign Application Priority Data

Mar. 27, 2018    (JP) .............................. JP2018-059178

(51) Int. Cl.
| | |
|---|---|
| *B60L 1/00* | (2006.01) |
| *H02J 7/14* | (2006.01) |
| *F02N 11/08* | (2006.01) |
| *B60L 58/20* | (2019.01) |
| *B60L 58/12* | (2019.01) |

(52) U.S. Cl.
CPC ............ *H02J 7/1423* (2013.01); *B60L 1/003* (2013.01); *B60L 58/12* (2019.02); *B60L 58/20* (2019.02); *F02N 11/087* (2013.01); *F02N 11/0862* (2013.01)

(58) Field of Classification Search
CPC ........ H02J 7/1423; B60L 58/12; B60L 58/20; B60L 1/003; F02N 11/0862; F02N 11/087
USPC ...................................................... 307/10.1
See application file for complete search history.

(56) References Cited

U.S. PATENT DOCUMENTS

| | | | |
|---|---|---|---|
| 6,417,579 B1* | 7/2002 | Lehnst .................... | B60K 28/14 307/10.7 |
| 6,765,312 B1* | 7/2004 | Urlass .................... | H02J 7/1423 307/10.1 |
| 2013/0229049 A1* | 9/2013 | Larsson .................... | B60L 1/00 307/9.1 |

FOREIGN PATENT DOCUMENTS

| | | |
|---|---|---|
| JP | 2014-036557 A | 2/2014 |
| JP | 2016-153260 A | 8/2016 |
| JP | 2016-195472 A | 11/2016 |

OTHER PUBLICATIONS

Japanese Notice of Reasons for Refusal issued in corresponding Japanese Patent Application No. 2018-059178, dated Oct. 8, 2019, with English translation.

* cited by examiner

*Primary Examiner* — Daniel Cavallari
*Assistant Examiner* — Dru Parries
(74) *Attorney, Agent, or Firm* — McDermott Will & Emery LLP

(57) ABSTRACT

A vehicle electric power supply apparatus includes a first electric power supply system, a second electric power supply system, an electric power fuse, a switch, a starter relay, an occupant operated unit, a starter control unit, and a switch control unit. The switch is controlled to be in one of an electrically-conductive state and a cutoff state. The starter relay is controlled to be in one of an electrically-conductive state or a cutoff state. The occupant operated unit is operated by an occupant. The starter control unit outputs an ON signal and the switch control unit outputs an OFF signal when the occupant operated unit is operated. The ON signal allows the starter relay to be controlled in the electrically-conductive state. The OFF signal allows the switch to be controlled in the cutoff state.

5 Claims, 12 Drawing Sheets

VEHICLE ELECTRIC POWER SUPPLY APPARATUS

CROSS-REFERENCE TO RELATED APPLICATIONS

The present application claims priority from Japanese Patent Application No. 2018-059178 filed on Mar. 27, 2018, the entire contents of which are hereby incorporated by reference.

BACKGROUND

The technology relates to a vehicle electric power supply apparatus to be mounted in a vehicle.

A vehicle electric power supply apparatus to be included in a vehicle has been proposed that includes an electric power generator (e.g. an alternator) coupled to an engine of the vehicle. For example, reference is made to Japanese Unexamined Patent Application Publication (JP-A) No. 2014-36557. JP-A No. 2014-36557 discloses an electric power supply apparatus having a lead-acid battery and a lithium-ion battery coupled to each other in a parallel manner. The lead-acid battery and the lithium-ion battery are each an electric power storage. This configuration makes it possible to charge not only the lead-acid battery but also the lithium-ion battery with use of regenerative electric power. Therefore, it is possible to increase the regenerative electric power upon vehicle deceleration, and enhance a fuel consumption performance of the vehicle accordingly.

SUMMARY

An aspect of the technology provides a vehicle electric power supply apparatus that includes: a first electric power supply system including an electric power generator and a first electric power storage, in which the electric power generator is configured to be driven to revolve by an engine of the vehicle, and the first electric power storage is coupled to the electric power generator; a second electric power supply system including a starter motor and a second electric power storage, in which the starter motor is configured to start operation of the engine, and the second electric power storage is coupled to the starter motor; an electric power fuse provided on an electrically-conducting path, in which the electrically-conducting path is configured to couple the first electric power supply system and the second electric power supply system to each other; a switch configured to be controlled in one of an electrically-conductive state and a cutoff state, in which the electrically-conductive state is a state in which the electric power fuse and the first electric power storage are coupled to each other, and the cutoff state is a state in which the electric power fuse and the first electric power storage are isolated from each other; a starter relay configured to be controlled in one of an electrically-conductive state and a cutoff state, in which the electrically-conductive state is a state in which the starter motor and the second electric power storage are coupled to each other, and the cutoff state is a state in which the starter motor and the second electric power storage are isolated from each other; an occupant operated unit configured to be operated by an occupant when the occupant starts the operation of the engine; a starter control unit configured to output an ON signal when the occupant operated unit is operated, in which the ON signal allows the starter relay to be controlled in the electrically-conductive state; and a switch control unit configured to output an OFF signal when the occupant operated unit is operated, in which the OFF signal allows the switch to be controlled in the cutoff state.

An aspect of the technology provides a vehicle electric power supply apparatus that includes: a first electric power supply system including an electric power generator and a first electric power storage, in which the electric power generator is configured to be driven to revolve by an engine of the vehicle, and the first electric power storage is coupled to the electric power generator; a second electric power supply system including a starter motor and a second electric power storage, in which the starter motor is configured to start operation of the engine, and the second electric power storage is coupled to the starter motor; an electric power fuse provided on an electrically-conducting path, in which the electrically-conducting path is configured to couple the first electric power supply system and the second electric power supply system to each other; a switch configured to be controlled in one of an electrically-conductive state and a cutoff state, in which the electrically-conductive state is a state in which the electric power fuse and the first electric power storage are coupled to each other, and the cutoff state is a state in which the electric power fuse and the first electric power storage are isolated from each other; a starter relay configured to be controlled in one of an electrically-conductive state and a cutoff state, in which the electrically-conductive state is a state in which the starter motor and the second electric power storage are coupled to each other, and the cutoff state is a state in which the starter motor and the second electric power storage are isolated from each other; an occupant operated unit configured to be operated by an occupant when the occupant starts the operation of the engine; and circuitry configured to output an ON signal when the occupant operated unit is operated, in which the ON signal allows the starter relay to be controlled in the electrically-conductive state; and output an OFF signal when the occupant operated unit is operated, in which the OFF signal allows the switch to be controlled in the cutoff state.

DETAILED DESCRIPTION

Figure 1:
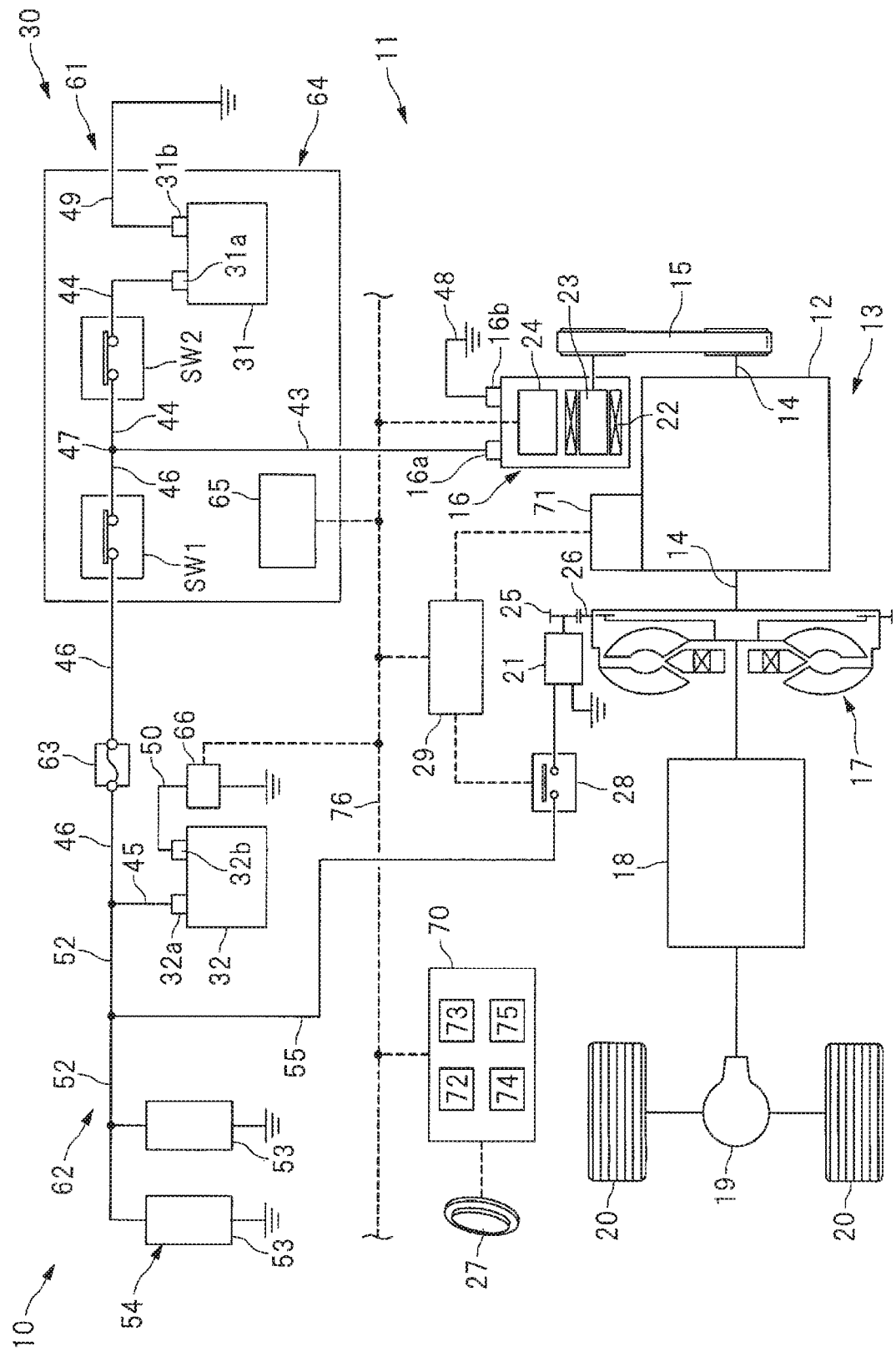
FIG. 1 is a schematic view of a configuration example of a vehicle mounting a vehicle electric power supply apparatus according to one implementation of the technology.

In the following, some example implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Electrical devices to be provided for an electric power supply apparatus include, for example, a starter motor that starts operation of an engine. The starter motor consumes large electric power. Therefore, in some operating states of a component such as the starter motor or a lithium-ion battery, an excessive electric current may possibly flow from the lithium-ion battery or other components to the starter motor. In order to protect a variety of electric devices from such an excessive electric current, the electric power supply apparatus is provided with an electric power fuse. The electric power fuse melts and is cut by such an excessive electric current. However, causing the electric power fuse in an electrical device to melt and to be cut leads to factors including, for example, a restriction of any of vehicle performances, and an increase in a repair cost. Accordingly, it is advantageous to suppress or prevent unnecessary melting or cutting of an electric power fuse.

It is desirable to suppress or prevent unnecessary melting or cutting of an electric power fuse.

[Vehicle Configuration]

FIG. 1 is a schematic diagram illustrating a configuration example of a vehicle 11 mounting a vehicle electric power supply apparatus 10 according to an example implementation of the technology. Referring to FIG. 1, the vehicle 11 may include a power unit 13. The power unit 13 may mount an engine 12 that serves as a power source. The engine 12 may include a crankshaft 14 that is coupled to a motor generator 16 via a belt mechanism 15. In one implementation, the motor generator 16 may serve as an "electric power generator". The engine 12 may also be coupled to a transmission mechanism 18 via a torque converter 17. The transmission mechanism 18 may be coupled to wheels 20 via a member such as a differential mechanism 19. Further, the power unit 13 may be provided with a starter motor 21. The starter motor 21 may rotate a crankshaft 14 of the engine 12 to start operation of the engine 12.

The motor generator 16 coupled to the engine 12 may be a so-called integrated starter generator (ISG) that serves both as an electric power generator and an electric motor. The motor generator 16 may serve as not only an electric power generator driven to revolve by the crankshaft 14 but also an electric motor that drives the crankshaft 14 to revolve. For example, the motor generator 16, as the electric motor, may be controlled to be in a powering state when restarting the engine 12 in an idling stop control, or when performing assist driving of the engine 12 upon start or acceleration. The motor generator 16 may include a stator 22 having a stator coil and a rotor 23 having a field coil. The motor generator 16 may further include an ISG controller 24 in order to control an electrically-conducting state of each of the stator coil and the field coil. The ISG controller 24 may be provided with components including an inverter, a regulator, and a microcomputer. The ISG controller 24 may control the electrically-conducting state of each of the field coil and the stator coil, thereby making it possible to control a voltage to be generated by the motor generator 16, and electric power generation torque, powering torque, and/or any other factor derived from the motor generator 16.

Further, the starter motor 21 may be provided with a pinion 25. The pinion 25 may be movable between a projecting position and a retracting position. The projecting position may be a position at which the pinion 25 is in mesh with a ring gear 26 of the torque converter 17. The retracting position may be a position at which the meshing of the pinion 25 with the ring gear 26 is released. As described later, when a starter button 27 is operated by an occupant, a starter relay 28 may be switched to be in an ON state. The starter relay 28 may control the electrical conduction of the starter motor 21. This switching of the starter relay 28 allows the starter motor 21 to be brought into electric conduction, to thereby cause the pinion 25 of the starter motor 21 to move to the projecting position. At the projecting position, the pinion 25 of the starter motor 21 may be driven to revolve. Accordingly, when the starter button 27 is operated by the occupant, the starter motor 21 may start the operation of the engine 12. Further, in order to control the starter motor 21 via the starter relay 28, the vehicle 11 may be provided with an engine controller 29. The engine controller 29 may include a component such as a microcomputer. In addition, in the vehicle 11 illustrated in FIG. 1, when restarting the engine 12 in the idling stop control, the operation of the engine 12 may be started with use of the motor generator 16. In contrast, when starting the engine 12 by the operation of the starter button 27, the operation of the engine 12 may be started with use of the starter motor 21.

[Electric Power Supply Circuit]

Figure 2:
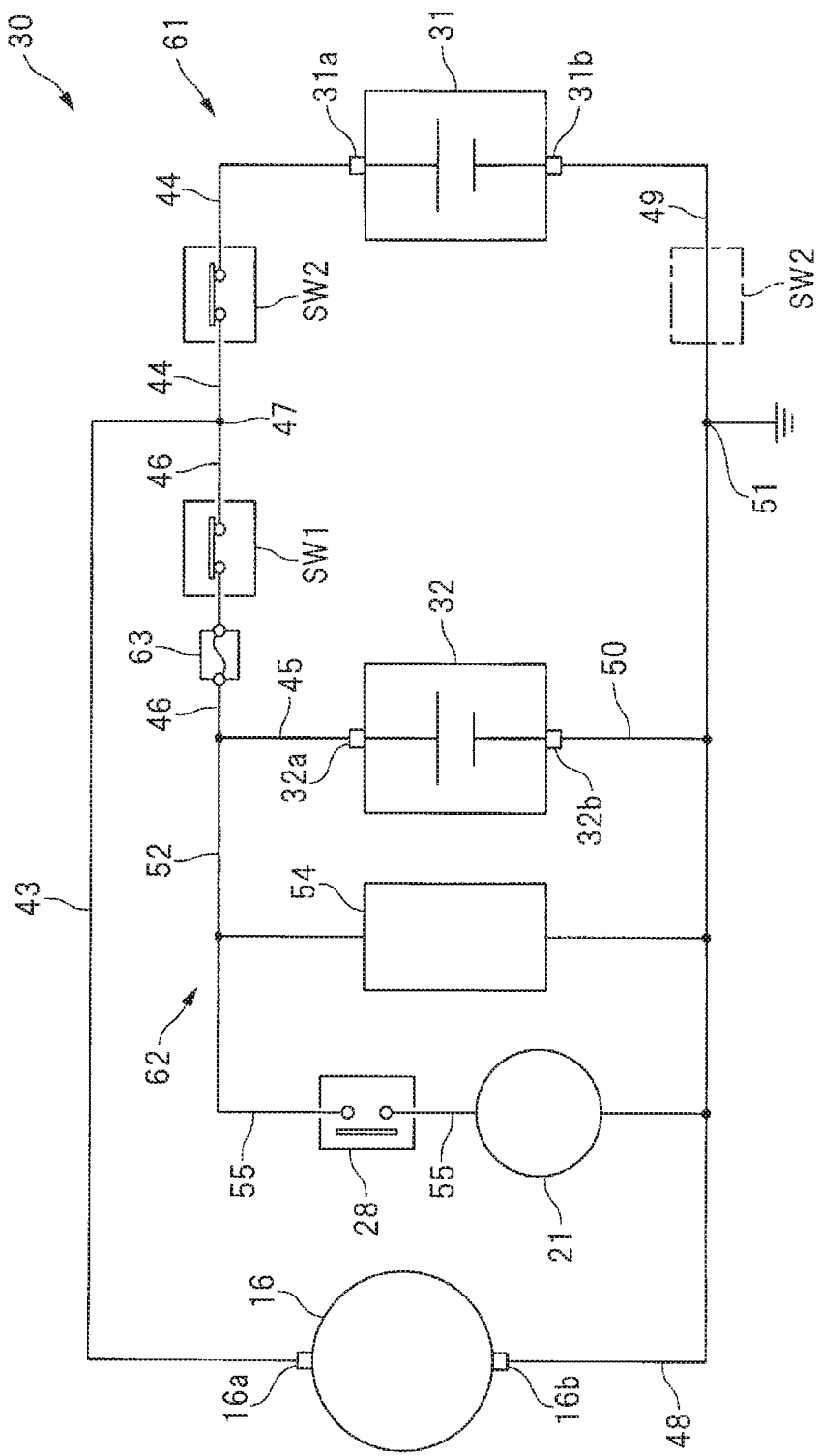
FIG. 2 is a circuit diagram schematically illustrating an example of an electric power supply circuit illustrated in FIG. 1.

A description is given of an electric power supply circuit 30 included in the vehicle electric power supply apparatus 10. FIG. 2 is a circuit diagram schematically illustrating an example of the electric power supply circuit 30. Referring to FIG. 2, the electric power supply circuit 30 may include a lithium-ion battery 31 and a lead-acid battery 32. In one implementation, the lithium-ion battery 31 may serve as a "first electric power storage". In one implementation, the lead-acid battery 32 may serve as a "second electric power storage". The lithium-ion battery 31 and the lead-acid battery 32 may be coupled to each other in parallel, and each may be electrically coupled to the motor generator 16. The lithium-ion battery 31 may have a terminal voltage that is designed higher than a terminal voltage of the lead-acid battery 32, in order to actively discharge the lithium-ion battery 31. Further, the lithium-ion battery 31 may have internal resistance that is designed smaller than internal resistance of the lead-acid battery 32, in order to actively charge and discharge the lithium-ion battery 31.

The motor generator 16 may include a positive terminal 16a coupled to a positive line 43. The lithium-ion battery 31 may include a positive terminal 31a coupled to a positive line 44. The lead-acid battery 32 may include a positive terminal 32a coupled to a positive line 46 via a positive line 45. These positive lines 43, 44, and 46 may be coupled to one another via a node 47. Further, the motor generator 16 may include a negative terminal 16b coupled to a negative line 48. The lithium-ion battery 31 may include a negative terminal 31b coupled to a negative line 49. The lead-acid battery 32 may include a negative terminal 32b coupled to a negative line 50. These negative lines 48, 49, and 50 may be coupled to one another via a reference potential point 51.

Further, the positive line 45 of the lead-acid battery 32 may be coupled to a positive line 52. The positive line 52 may be coupled to the starter motor 21 and an electrical device group 54. The electrical device group 54 may include a variety of electrical devices 53. An electrically-conducting line 55 may couple the positive line 52 and the starter motor 21 to each other. The starter relay 28 may be provided on the electrically-conducting line 55. The starter relay 28 is controlled to be in one of an ON state (i.e., an electrically-conductive state) and an OFF state (i.e., a cutoff state). The electric power supply circuit 30 may include a battery controller 65. The battery controller 65 may control the starter relay 28 to be in the ON state (i.e., a closed state), to thereby make it possible to couple the starter motor 21 and the lead-acid battery 32 to each other. In contrast, the battery controller 65 may control the starter relay 28 to be in the OFF state (i.e., an opened state), to thereby make it possible to isolate the starter motor 21 and the lead-acid battery 32 from each other. In an example implementation, the starter relay 28 may be a mechanical relay that opens and closes a contact by means of electromagnetic force, for example. In another example implementation, the starter relay 28 may be a relay including a semiconductor element.

Referring to FIG. 2, the electric power supply circuit 30 may include a first electric power supply system 61 and a second electric power supply system 62. The first electric power supply system 61 may include the lithium-ion battery 31 and the motor generator 16. The second electric power supply system 62 may include the lead-acid battery 32 and the electrical device group 54. The first electric power supply system 61 and the second electric power supply system 62 may be coupled to each other via the positive line 46. In one implementation, the positive line 46 may serve as an "electrically-conducting path". The positive line 46 may be provided with an electric power fuse 63. The electric power fuse 63 melts and is cut by an excessive electric current. The positive line 46 may also be provided with a switch SW1. In one implementation, the switch SW1 may serve as a "switch" or a "first switch". The switch SW1 may be controlled to be in one of the ON state (i.e., the electrically-conductive state) and the OFF state (i.e., the cutoff state). Further, the switch SW1 provided on the positive line 46 may be disposed between the electric power fuse 63 and the node 47. The positive line 44 of the lithium-ion battery 31 may be further provided with a switch SW2. In one implementation, the switch SW2 may serve as a "switch" or a "second switch". The switch SW2 may be controlled to be in one of the ON state (i.e., the electrically-conductive state) and the OFF state (i.e., the cutoff state).

Both the switch SW1 and the switch SW2 may be provided on an electrically-conducting path that is disposed between the lithium-ion battery 31 and the electric power fuse 63. Therefore, the battery controller 65 may control each of the switches SW1 and SW2 to be in the ON state (i.e., the closed state), to thereby make it possible to couple the lithium-ion battery 31 and the electric power fuse 63 to each other. In contrast, the battery controller 65 may control each of the switches SW1 and SW2 to be in the OFF state (i.e., the opened state), to thereby make it possible to isolate the lithium-ion battery 31 and the electric power fuse 63 from each other. The battery controller 65 will be described later. The battery controller 65 may further control the switch SW1 to be in the ON state, to thereby make it possible to couple the first electric power supply system 61 and the second electric power supply system 62 to each other. In contrast, the battery controller 65 may control the switch SW1 to be in the OFF state, to thereby make it possible to isolate the first electric power supply system 61 and the second electric power supply system 62 from each other. Moreover, the battery controller 65 may control the switch SW2 to be in the ON state, to thereby make it possible to couple the lithium-ion battery 31 to the first electric power supply system 61. In contrast, the battery controller 65 may control the switch SW2 to be in the OFF state, to thereby make it possible to isolate the lithium-ion battery 31 from the first electric power supply system 61. The switches SW1 and SW2 may each include a semiconductor element such as, but not limited to, a metal-oxide-semiconductor field-effect transistor (MOSFET). In an example implementation, the switches SW1 and SW2 may be each a mechanical switch that opens and closes a contact by means of electromagnetic force, for example. Note that the switches SW1 and SW2 may each include a relay, a contactor, and/or any other components.

Referring to FIG. 1, the electric power supply circuit 30 may include a battery module 64. The lithium-ion battery 31 and the switches SW1 and SW2 may be each incorporated into the battery module 64. The battery module 64 may further include the battery controller 65. The battery controller 65 may include the microcomputer, for example. The battery controller 65 may further have a monitoring system and a control system. Non-limiting examples of the monitoring system may include monitoring of a state of charge SOC, electric charge and discharge currents, the terminal voltage, a cell temperature, and the internal resistance of the lithium-ion battery 31. Non-limiting examples of the control system may include controlling each of the switches SW1 and SW2. Note that the state of charge SOC may refer to a ratio of an electric power storage amount of a battery to a designed capacity of the battery. Also note that the negative line 50 of the lead-acid battery 32 may be provided with a battery sensor 66. The battery sensor 66 may detect factors including, for example, the electric charge and discharge currents, the terminal voltage, and the state of charge SOC.

[Control System]

Referring to FIG. 1, the vehicle electric power supply apparatus 10 may be provided with a main controller 70, in order to control the components including the power unit 13 and the electric power supply circuit 30. The main controller 70 may include a microcomputer, for example. The main controller 70 may control the power unit 13, the electric power supply circuit 30, and other components in a cooperative manner. The main controller 70 may include components including an engine control unit 72, a motor control unit 73, a switch control unit 74, and a starter control unit 75. The engine control unit 72 may control an auxiliary machine 71. The auxiliary machine 71 may include, for example, a throttle valve and an injector. The motor control unit 73 may control the motor generator 16. The switch control unit 74 may control the switches SW1 and SW2. The starter control unit 75 may control the starter relay 28.

The main controller 70 and other controllers including, for example, the ISG controller 24, the engine controller 29, and the battery controller 65 may be so coupled to one another as to be able to perform communication mutually and freely via an in-vehicle network 76. Non-limiting examples of the in-vehicle network 76 may include a controller area network (CAN) and a local interconnect network (LIN). The main controller 70 may control components including the power unit 13 and the electric power supply circuit 30 on the basis of pieces of information obtained from various controllers and various sensors of the vehicle 11. The motor control unit 73 of the main controller 70 may control an operating state of the motor generator 16 via the ISG controller 24. The engine control unit 72 and the starter control unit 75 of the main controller 70 may respectively control an operating state of the auxiliary machine 71 and an operating state of the starter relay 28 via the engine controller 29. The switch control unit 74 of the main controller 70 may control an operating state of each of the switches SW1 and SW2 via the battery controller 65.

The main controller 70 may be further coupled to the starter button 27. In one implementation, the starter button 27 may serve as an "occupant operated unit". The starter button 27 may be operated by an occupant when the occupant starts the engine 12. Note that the main controller 70 may be coupled to unillustrated devices including an accelerator sensor, a brake sensor and a vehicle speed sensor. The main controller 70 may receive information relating to the operations of the components including the engine 12, the motor generator 16, and the battery module 64 from each of the corresponding controllers. The controllers may include, for example, the ISG controller 24, the engine controller 29, and the battery controller 65.

[Electric Power Supply Situations]

The main controller 70 may set a target electric power-generation voltage of the motor generator 16 on the basis of the state of charge SOC of the lithium-ion battery 31. Thereafter, the main controller 70 may output information relating to the target electric power-generation voltage to the ISG controller 24. The main controller 70 may thereby control the motor generator 16 to be in a combustion electric power generation state or in an electric power generation suspended state, as described later.

Figure 3:
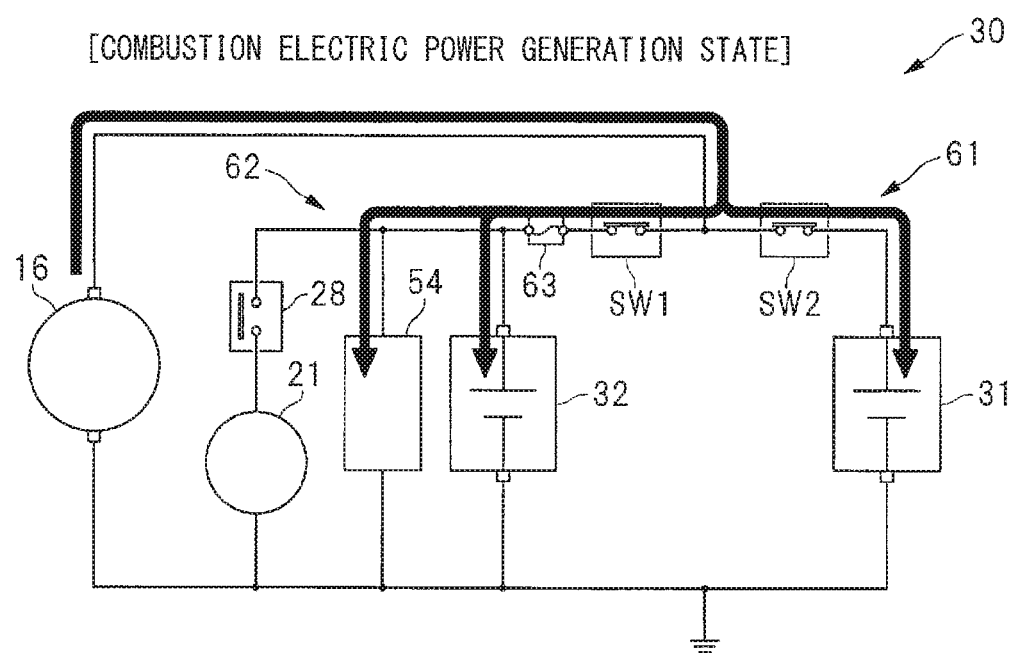
FIG. 3 is a diagram illustrating an example of an electric current supply situation when a motor generator is controlled to be in a combustion electric power generation state.

FIG. 3 is a diagram illustrating an example of an electric current supply situation when the motor generator 16 is controlled to be in the combustion electric power generation state. For example, in a case where the state of charge SOC (i.e., a charged level) of the lithium-ion battery 31 is lower than a predetermined lower limit value, the motor generator 16 may be driven to generate electricity by means of engine power in order to charge the lithium-ion battery 31 for enhancement of the state of charge SOC. Accordingly, when the motor generator 16 is controlled to be in the combustion electric power generation state, a voltage to be generated by the motor generator 16 may be raised, and the generated voltage to be applied to the lithium-ion battery 31 may be adjusted higher than the terminal voltage of the lithium-ion battery 31. This causes the motor generator 16 to supply an electric current to components including the lithium-ion battery 31 and the lead-acid battery 32, as indicated by black arrows in FIG. 3. Consequently, components including the lithium-ion battery 31 and the lead-acid battery 32 may be gently charged.

Figure 4:
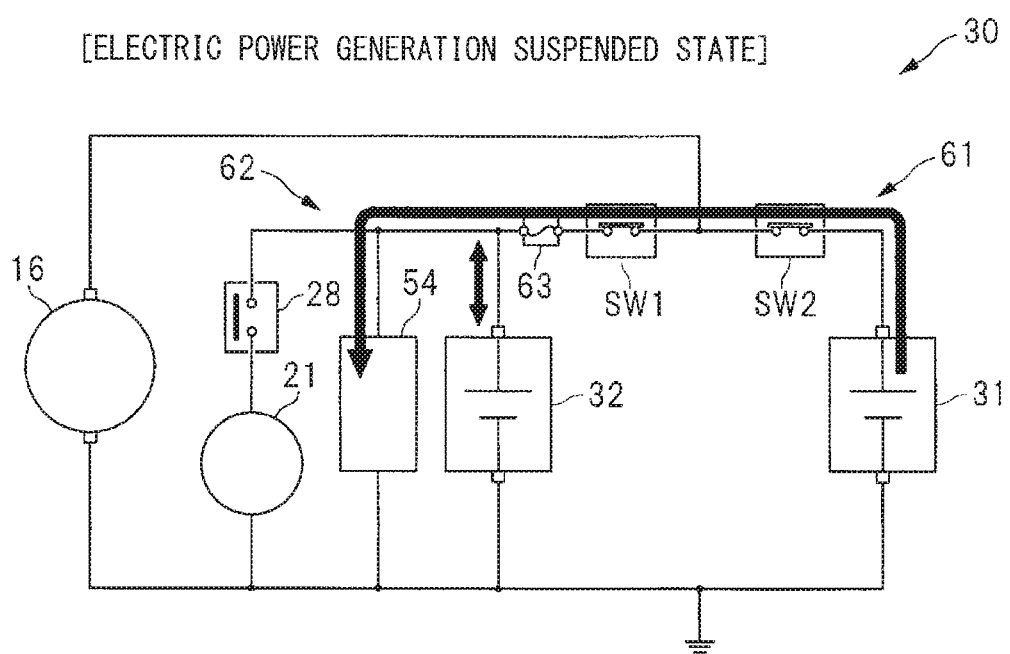
FIG. 4 is a diagram illustrating an example of an electric current supply situation when the motor generator is controlled to be in an electric power generation suspended state.

FIG. 4 is a diagram illustrating an example of an electric current supply situation when the motor generator 16 is controlled to be in the electric power generation suspended state. For example, in a case where the state of charge SOC of the lithium-ion battery 31 is higher than a predetermined upper limit value, the driving of the motor generator 16 to generate electricity by means of the engine power may be suspended in order to actively discharge the lithium-ion battery 31. Accordingly, when the motor generator 16 is controlled to be in the electric power generation suspended state, the voltage to be generated by the motor generator 16 may be lowered, and further, the generated voltage to be applied to the lithium-ion battery 31 may be adjusted lower than the terminal voltage of the lithium-ion battery 31. This causes an electric current to be supplied from the lithium-ion battery 31 to the electrical device group 54, as indicated by the black arrow in FIG. 4. Hence, this makes it possible to suppress or stop the driving of the motor generator 16 to generate electricity, leading to the reduction in engine load.

In an example implementation described above, the main controller 70 may control the motor generator 16 to be in a state such as the combustion electric power generation state or in the electric power generation suspended state on the basis of the state of charge SOC. However, it is advantageous to collect large kinetic energy upon the vehicle deceleration, to thereby enhance a fuel consumption performance. For this reason, upon the vehicle deceleration, the voltage to be generated by the motor generator 16 may be raised greatly, and the motor generator 16 may be controlled to be in a regenerative electric power generation state. This makes it possible to increase the electric power generated by the motor generator 16, (e.g. the regenerative electric power). Accordingly, it is possible to actively convert the kinetic energy into the electric energy and collect the converted electric energy. Hence, it becomes possible to enhance an energy efficiency of the vehicle 11 and to thereby improve the fuel consumption performance of the vehicle 11.

Whether or not to control the motor generator 16 to be in the regenerative electric power generation state may be determined on the basis of a factor such as an operating state of the accelerator pedal or the brake pedal. In other words, upon deceleration traveling where the accelerator pedal is released from being pressed down on or where the brake pedal is pressed down on, fuel supply to the engine 12 may be restricted (i.e., a fuel-cut state). In such a situation, the motor generator 16 may be controlled to be in the regenerative electric power generation state. In contrast, upon an acceleration traveling or a steady traveling during which the accelerator pedal is pressed down on, a fuel may be injected in the engine 12 (i.e., a fuel-supply state). In such a situation, the motor generator 16 may be controlled to be in the combustion electric power generation state or in the electric power generation suspended state.

Figure 5:
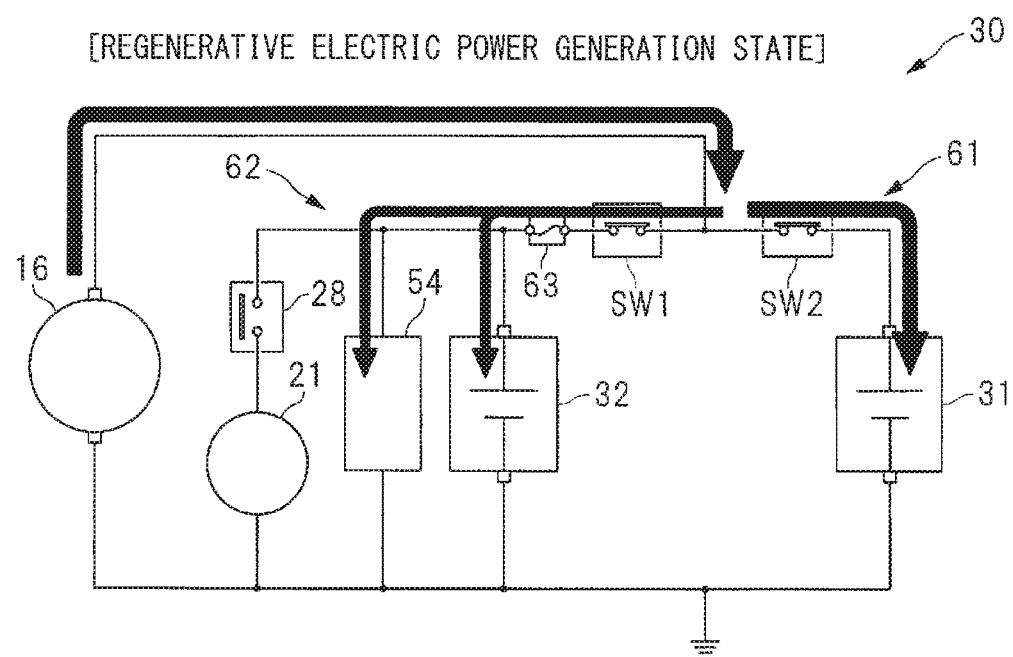
FIG. 5 is a diagram illustrating an example of an electric current supply situation when the motor generator is controlled to be in a regenerative electric power generation state.

FIG. 5 is a diagram illustrating an example of an electric current supply situation when the motor generator 16 is controlled to be in the regenerative electric power generation state. When the motor generator 16 is controlled to be in the regenerative electric power generation state, the voltage to be generated by the motor generator 16 may be raised higher than the voltage in the above-described combustion electric power generation state, and the generated voltage to be applied to the lithium-ion battery 31 may be raised greatly higher than the terminal voltage of the lithium-ion battery 31. This causes a large electric current to flow from the motor generator 16 to components including the lithium-ion battery 31 and the lead-acid battery 32, as indicated by the black arrows in FIG. 5. Therefore, the lithium-ion battery 31 and the lead-acid battery 32 may be quickly charged. In addition, the internal resistance of the lithium-ion battery 31 may be designed smaller than the internal resistance of the lead-acid battery 32. Therefore, most of the generated electric current may be supplied to the lithium-ion battery 31.

Referring to FIGS. 3 to 5, the switches SW1 and SW2 may be maintained in the ON state when the motor generator 16 is controlled to be in the combustion electric power generation state, the regenerative electric power generation state, or the electric power generation suspended state. In other words, the vehicle electric power supply apparatus 10 makes it possible to control the electric charge and the discharge of the lithium-ion battery 31 by simply controlling the voltage to be generated by the motor generator 16, without performing switch control of the switches SW1 and SW2. This makes it possible to easily control the electric charge and discharge of the lithium-ion battery 31, and to improve durability of each of the switch SW1 and the switch SW2.

Figure 6:
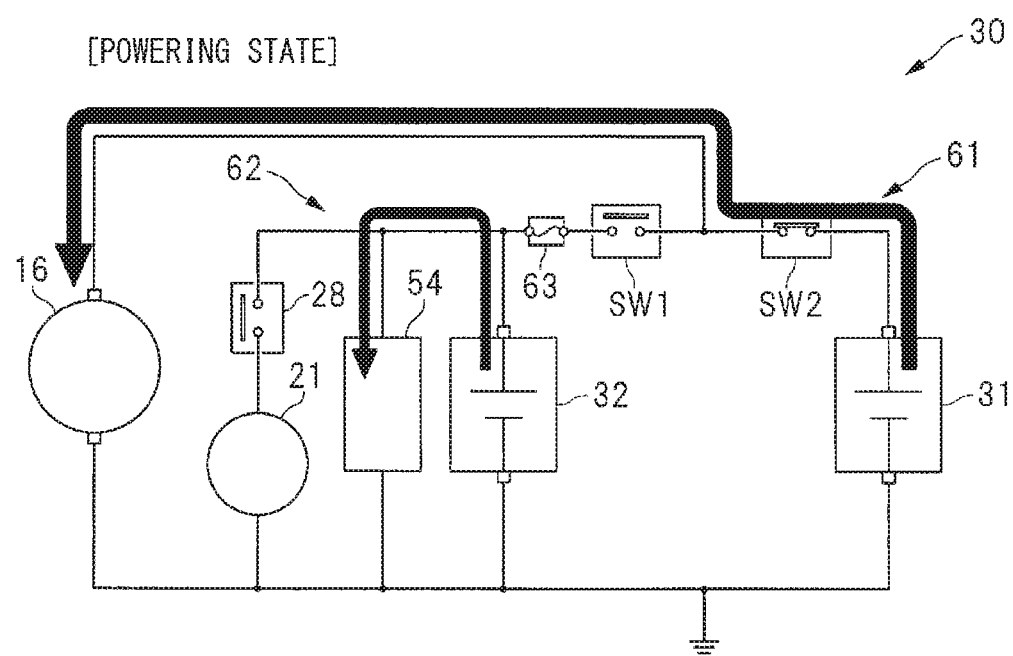
FIG. 6 is a diagram illustrating an example of an electric current supply situation when the motor generator is controlled to be in a powering state.

FIG. 6 is a diagram illustrating an example of an electric current supply situation when the motor generator 16 is controlled to be in a powering state. Referring to FIG. 6, the switch SW1 may be switched from the ON state to the OFF state when the motor generator 16 is controlled to be in the powering state. In other words, the switch SW1 may be switched from the ON state to the OFF state when the engine 12 is restarted by the motor generator 16, for example. This causes the first electric power supply system 61 and the second electric power supply system 62 to be isolated from each other. Accordingly, it is possible to prevent the electrical device group 54 and other components from being influenced by an instantaneous voltage drop and to thereby allow for the normal operation of each of the electrical device group 54 and other components, even when a large electric current is supplied from the lithium-ion battery 31 to the motor generator 16.

[Starter Button Operation]

Figure 7:
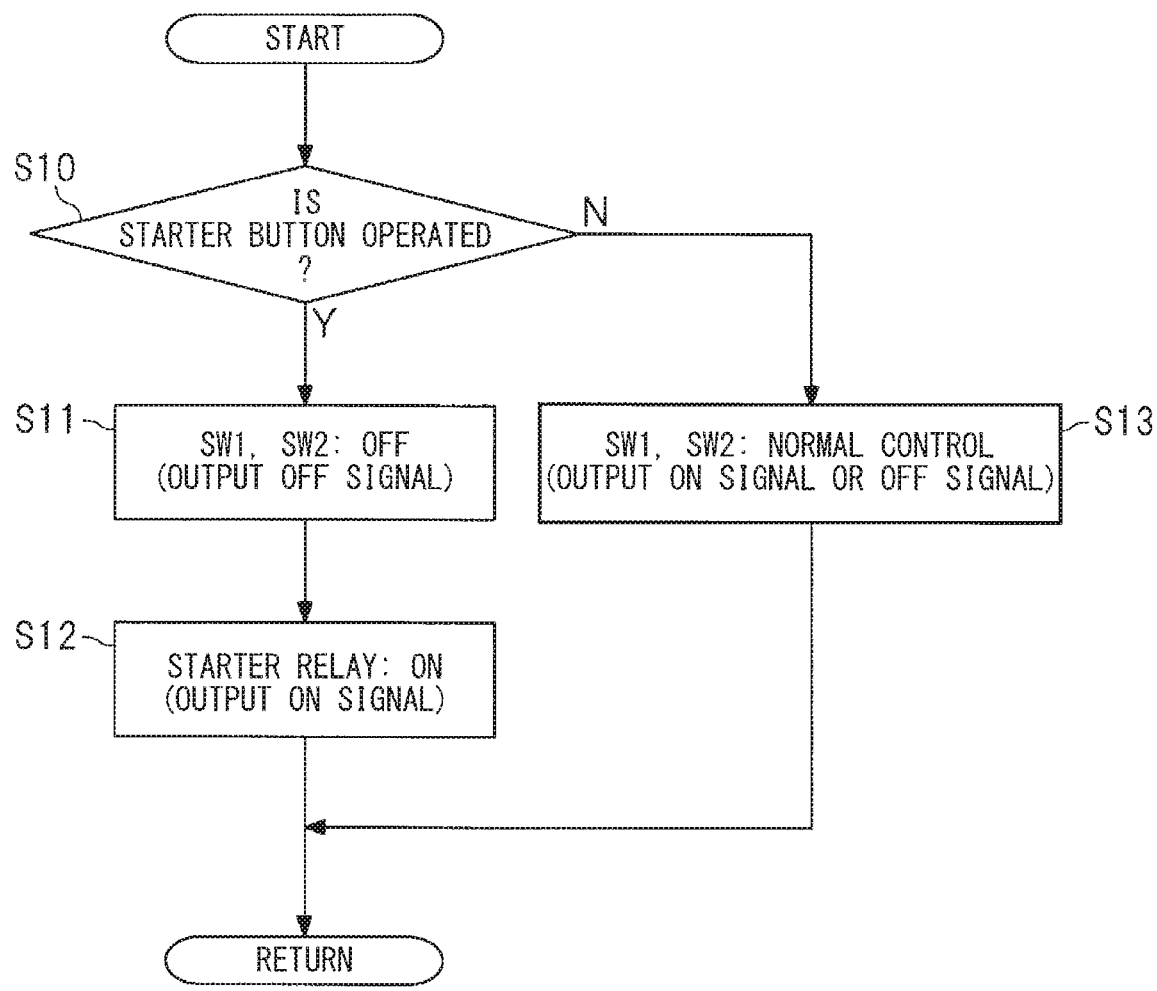
FIG. 7 is a flowchart illustrating an example of a control procedure performed by a switch control unit and a starter control unit each included in a main controller illustrated in FIG. 1.
Figure 8:
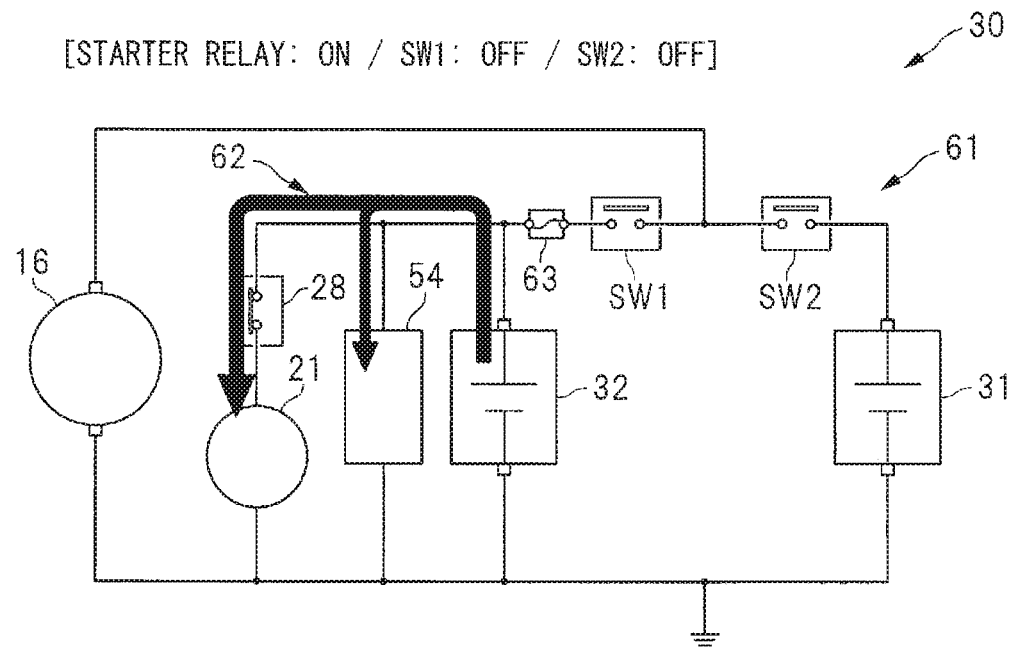
FIG. 8 is a diagram illustrating an example of an electric current supply situation when a starter button illustrated in FIG. 1 is operated.

In an example implementation described previously, when the starter button 27 is operated by an occupant, the starter relay 28 may be controlled to be in the ON state, and thereby the starter motor 21 may enter the electrically-conducting state. The starter motor 21 consumes large electric power. At this occasion, a large electric current may possibly flow in the electric power supply circuit 30. Therefore, in terms of suppressing or preventing unnecessary melting or cutting of the electric power fuse 63, the main controller 70 may control the switches SW1 and SW2 in accordance with the operation of the starter button 27. A description is given below of a control procedure of the switches SW1 and SW2 and the starter relay 28 when the starter button 27 is operated by an occupant. FIG. 7 is a flowchart illustrating an example of a control procedure performed by the switch control unit 74 and the starter control unit 75 each included in the main controller 70. FIG. 8 is a diagram illustrating an example of an electric current supply situation when the starter button 27 is operated by the occupant.

Referring to FIG. 7, in step S10, a determination may be made as to whether the starter button 27 is operated by the occupant. A flow may proceed to step S11 when the starter button 27 is determined in step S10 as being operated ("Y" in step S10). In step S11, an OFF signal may be outputted from the switch control unit 74 to the battery controller 65. In step S11, the switches SW1 and SW2 may be controlled to be in the OFF state by the OFF signal. Thereafter, the flow may proceed to step S12. In step S12, an ON signal may be outputted from the starter control unit 75 to the engine controller 29. The starter relay 28 may be controlled to be in the ON state by the ON signal.

In contrast, the flow may proceed to step S13 when the starter button 27 is determined in step S10 as not being operated ("N" in step S10). In step S13, the switches SW1 and SW2 may be controlled in a regular manner on the basis of an operating state of the power unit 13 or the electric power supply circuit 30. For example, in step S13, each of the switches SW1 and SW2 may be controlled to be in the ON state when the motor generator 16 is controlled to be in the combustion electric power generation state, the regenerative electric power generation state, or the electric power generation suspended state. Further, in step S13, when the motor generator 16 is controlled to be in the powering state, the switch SW1 may be controlled to be in the OFF state, and further, the switch SW2 may be controlled to be in the ON state. Moreover, in step S13, when an abnormality occurs in the lithium-ion battery 31, the switch SW1 may be controlled to be in the ON state, and further, the switch SW2 may be controlled to be in the OFF state.

In an example implementation described above, the OFF signal may be outputted to each of the switches SW1 and SW2 when the starter button 27 is operated by the occupant. This allows each of the switches SW1 and SW2 to be controlled in the OFF state, as illustrated in FIG. 8. Accordingly, it is possible to isolate the starter motor 21 and the lithium-ion battery 31 from each other, to thereby make it possible to prevent excessive electric discharge from the lithium-ion battery 31 having small internal resistance. In other words, it is possible to prevent excessive electric discharge from the lithium-ion battery 31 to the starter motor 21. Hence, it is possible to prevent, in advance, unnecessary melting or cutting of the electric power fuse 63 due to the operation of the starter button 27.

Figure 9:
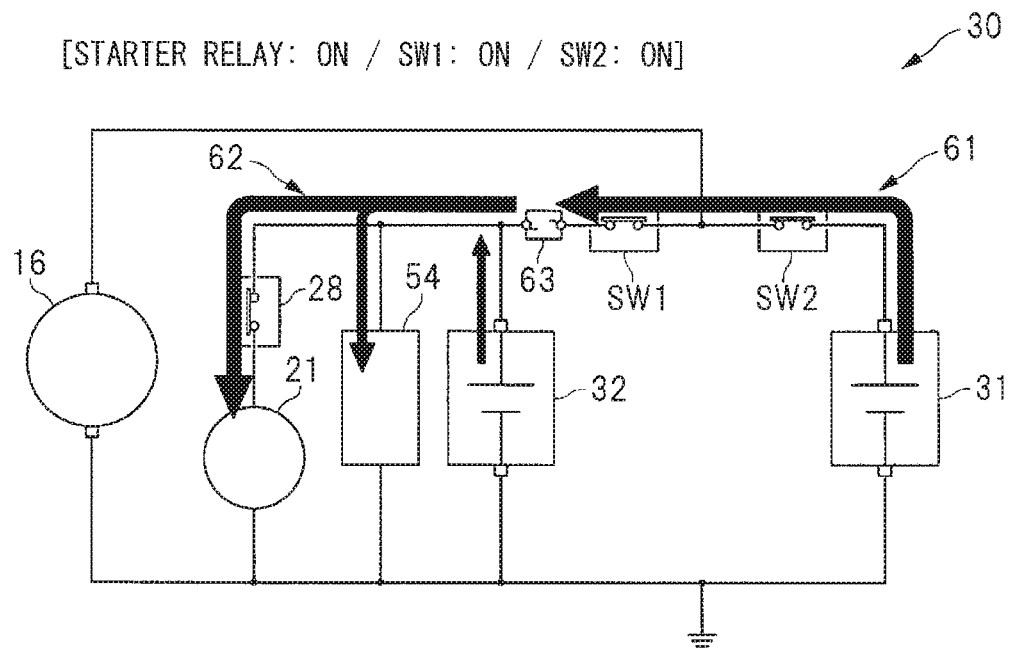
FIG. 9 is a diagram illustrating an example of an electric current supply situation when a starter relay, a switch SW1, and a switch SW2, each illustrated in FIG. 1, are each in an ON state.

FIG. 9 is a diagram illustrating an electric current supply situation when the starter relay 28 and the switches SW1 and SW2 are each in the ON state. As indicated by black arrows in FIG. 9, a large electric current is supplied from the lithium-ion battery 31 to the starter motor 21 when the starter relay 28 is switched to be in the ON state while the switches SW1 and SW2 remain in the ON state. As illustrated in FIG. 9, an excessive electric current flowing to the starter motor 21 may possibly cause the electric power fuse 63 to melt and be cut. However, as illustrated in FIG. 8, outputting the OFF signal to each of the switches SW1 and SW2 in accordance with the operation of the starter button 27 makes it possible to isolate the lithium-ion battery 31 from the starter motor 21, to thereby prevent unnecessary melting or cutting of the electric power fuse 63.

In addition, the OFF signal may be always outputted to each of the switches SW1 and SW2 when the starter button 27 is operated by the occupant. Therefore, it is possible to cause the switches SW1 and SW2 to be cut off properly even when the starter button 27 is operated in any situation. For example, the switches SW1 and SW2 may be forcibly cut off even when the starter button 27 is operated during, for example, traveling of the vehicle 11. Accordingly, it is possible to prevent the electric power fuse 63 from melting and being cut due to the operation of the starter button 27. Thus, it is possible to prevent the electric power fuse 63 from melting and being cut due to the operation of the starter button 27, which makes it possible to easily configure a control program for the switches SW1 and SW2.

Figure 10A:
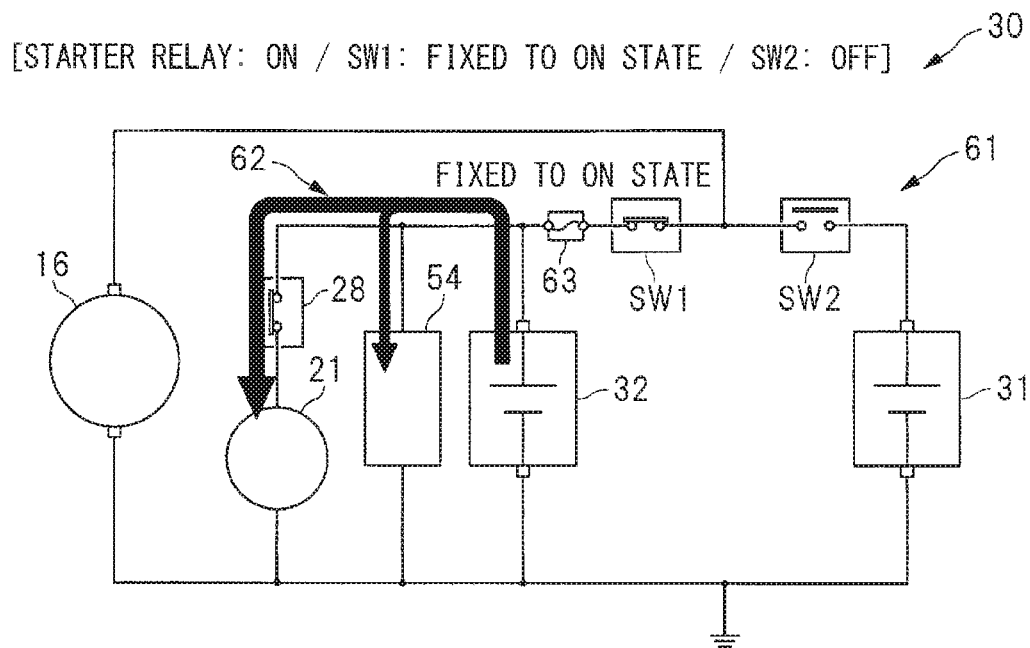
FIG. 10A is a diagram illustrating an example of an electric current supply situation when the switch SW1 is fixed to an ON position.
Figure 10B:
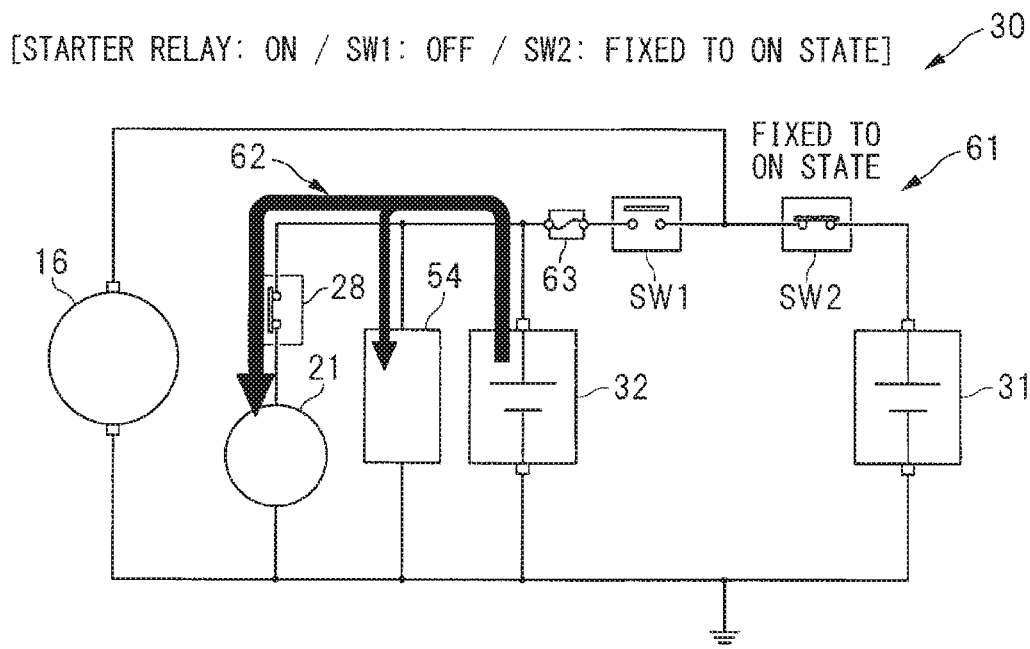
FIG. 10B is a diagram illustrating an example of an electric current supply situation when the switch SW2 is fixed to the ON position.

In addition, the OFF signal may be outputted to each of the switches SW1 and SW2 when the starter button 27 is operated by the occupant. Therefore, it is possible to prevent, in advance, the electric power fuse 63 from melting and being cut even when an error occurs. The error may include, for example, a situation in which one of the switch SW1 and the switch SW2 is fixed to an ON position. FIG. 10A is a diagram illustrating an electric current supply situation when the switch SW1 is fixed to the ON position. FIG. 10B is a diagram illustrating an electric current supply situation when the switch SW2 is fixed to the ON position.

Referring to FIG. 10A, the OFF signal may be outputted to both of the switches SW1 and SW2 when the starter button 27 is operated by the occupant, even when the switch SW1 is fixed to the ON position. Therefore, it is possible to cause the switch SW2 to be controlled in the OFF state. Thus, the switch SW2 is controlled to be in the OFF state even when the switch SW1 is fixed to the ON position. Accordingly, it is possible to prevent excessive electric discharge from the lithium-ion battery 31 to the starter motor 21, making it possible to prevent the electric power fuse 63 from melting and being cut.

Similarly to an example illustrated in FIG. 10A, referring to FIG. 10B, the OFF signal may be outputted to both of the switches SW1 and SW2 when the starter button 27 is operated by the occupant, even when the switch SW2 is fixed to the ON position. Therefore, it is possible to cause the switch SW1 to be controlled in the OFF state. Thus, the switch SW1 is controlled to be in the OFF state even when the switch SW2 is fixed to the ON position. Accordingly, it is possible to prevent excessive electric discharge from the lithium-ion battery 31 to the starter motor 21, making it possible to prevent the electric power fuse 63 from melting and being cut.

[Starter Button Operation (Another Operation)]

Figure 11:
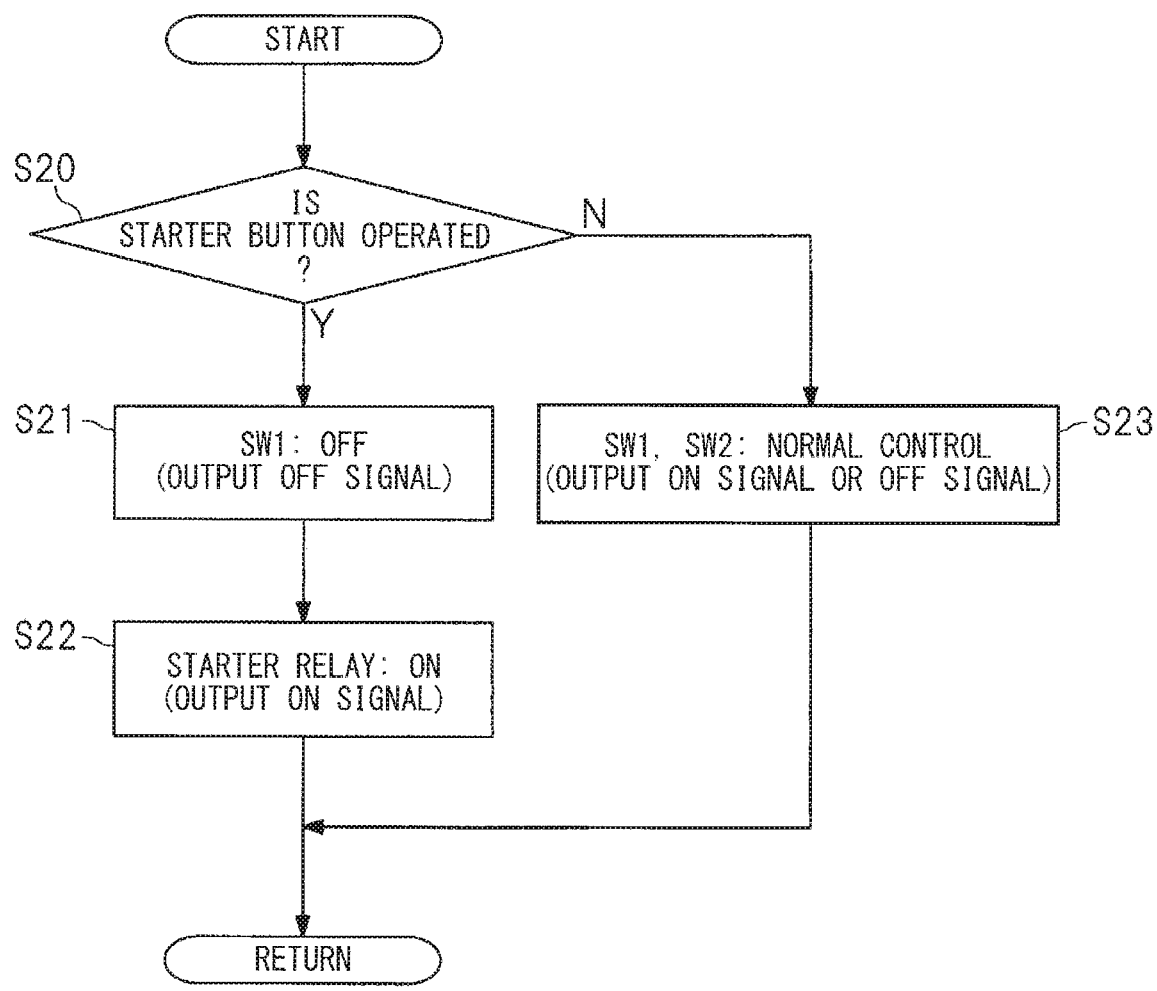
FIG. 11 is a flowchart illustrating another example of the control procedure performed by the switch control unit and the starter control unit each included in the main controller illustrated in FIG. 1.
Figure 12A:
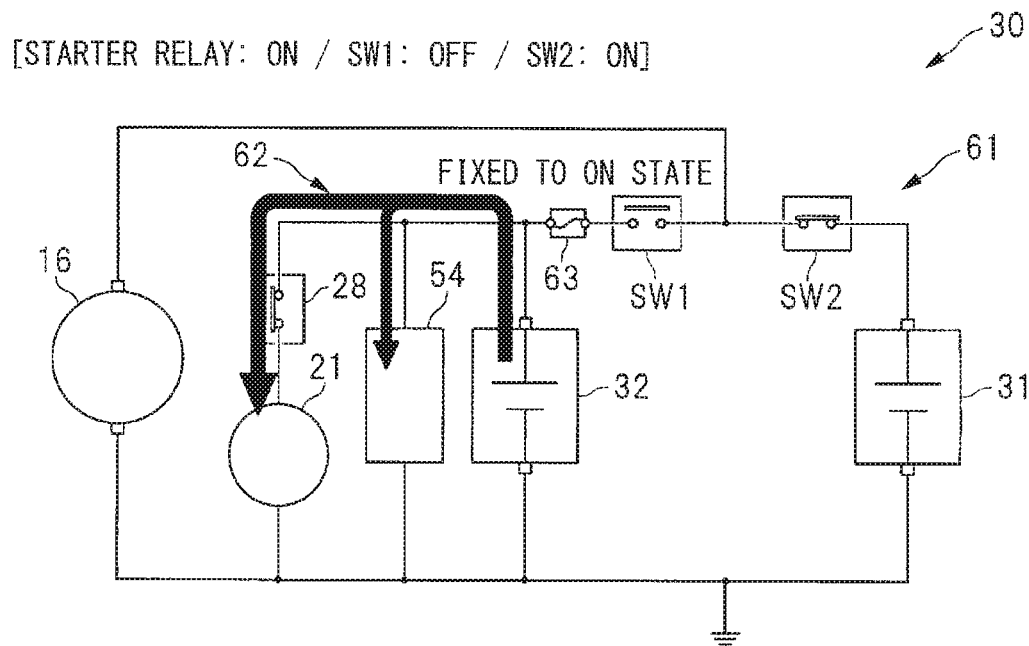
FIG. 12A is a diagram illustrating another example of the electric current supply situation when the starter button illustrated in FIG. 1 is operated.
Figure 12B:
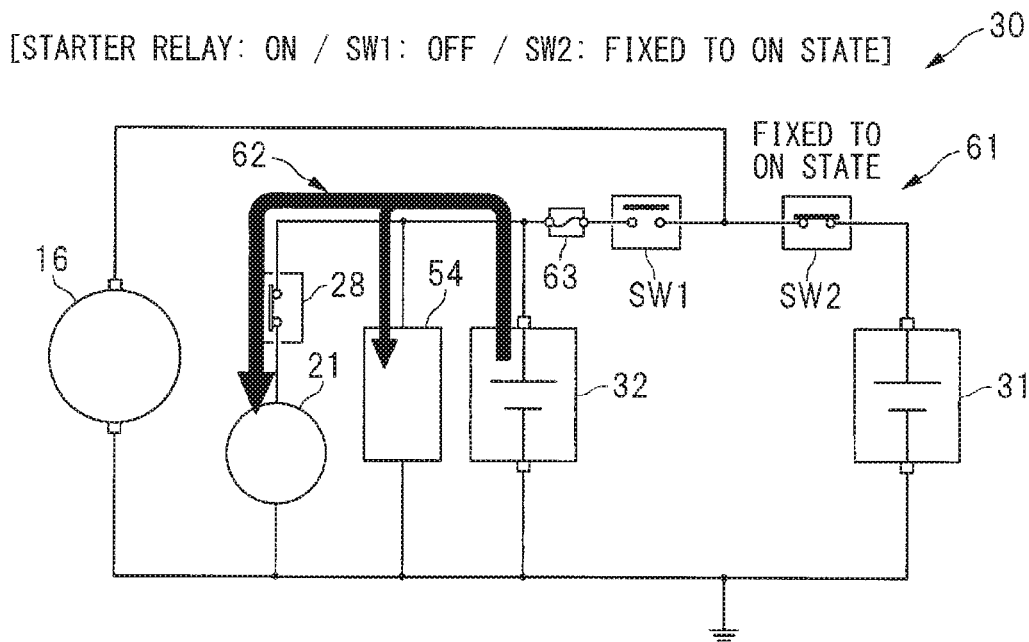
FIG. 12B is a diagram illustrating yet another example of the electric current supply situation when the starter button illustrated in FIG. 1 is operated.

In an example implementation described above, the OFF signal may be outputted to each of the switches SW1 and SW2 when the starter button 27 is operated by the occupant. However, this is not limitative. In an example implementation, the OFF signal may be outputted only to the switch SW1. Alternatively, the OFF signal may be outputted only to the switch SW2. A description will be given below of another example of the control procedure of the switches SW1 and SW2 and the starter relay 28 when the starter button 27 is operated by the occupant. FIG. 11 is a flowchart illustrating another example of the control procedure performed by the switch control unit 74 and the starter control unit 75 each included in the main controller 70 illustrated in FIG. 1. FIGS. 12A and 12B are each a diagram illustrating an example of an electric current supply situation when the starter button 27 is operated by the occupant.

Referring to FIG. 11, in step S20, a determination may be made as to whether the starter button 27 is operated by the occupant. A flow may proceed to step S21 when the starter button 27 is determined in step S20 as being operated ("Y" in step S20). An OFF signal may be outputted from the switch control unit 74 to the battery controller 65. The switch SW1 may be controlled to be in the OFF state by the OFF signal. Thereafter, the flow may proceed to step S22. In step S22, an ON signal may be outputted from the starter control unit 75 to the engine controller 29. The starter relay 28 may be controlled to be in the ON state by the ON signal.

In contrast, the flow may proceed to step S23 when the starter button 27 is determined in step S20 as not being operated ("N" in step S20). In step S23, the switches SW1 and SW2 may be controlled in a regular manner on the basis of an operating state of the power unit 13 or the electric power supply circuit 30. For example, in step S23, when the motor generator 16 is controlled to be in the combustion electric power generation state, the regenerative electric power generation state, or the electric power generation suspended state, each of the switches SW1 and SW2 may be controlled to be in the ON state. Further, in step S23, when the motor generator 16 is controlled to be in the powering state, the switch SW1 may be controlled to be in the OFF state, and the switch SW2 may be controlled to be in the ON state. Moreover, in step S23, when an abnormality occurs in the lithium-ion battery 31, the switch SW1 may be controlled to be in the ON state, and further, the switch SW2 may be controlled to be in the OFF state.

In an example implementation described above, the OFF signal may be outputted to the switch SW1 when the starter button 27 is operated by the occupant. This allows the switch SW1 to be controlled in the OFF state, as illustrated in FIG. 12A. Accordingly, it is possible to isolate the starter motor 21 and the lithium-ion battery 31 from each other, to thereby make it possible to prevent excessive electric discharge from the lithium-ion battery 31 having small internal resistance. In other words, it is possible to prevent, in advance, excessive electric discharge from the lithium-ion battery 31 to the starter motor 21. Hence, it is possible to prevent unnecessary melting or cutting of the electric power fuse 63 due to the operation of the starter button 27.

In addition, the OFF signal may be always outputted to the switch SW1 when the starter button 27 is operated by the occupant. Therefore, it is possible to cause the switch SW1 to be cut off properly even when the starter button 27 is operated in any situation. For example, the switch SW1 may be forcibly cut off even when the starter button 27 is operated during, for example, traveling of the vehicle 11. Accordingly, it is possible to prevent the electric power fuse 63 from melting and being cut due to the operation of the starter button 27. Thus, it is possible to prevent, in advance, the electric power fuse 63 from melting and being cut due to the operation of the starter button 27, making it possible to easily configure a control program for the switches SW1 and SW2.

In addition, the OFF signal may be outputted to the switch SW1 when the starter button 27 is operated by the occupant. Therefore, it is possible to prevent the electric power fuse 63 from melting and being cut even when an error occurs. The error may include, for example, a situation in which the switch SW2 is fixed to the ON position. Referring to FIG. 12B, the OFF signal may be outputted to the switch SW1 when the starter button 27 is operated by the occupant, even when the switch SW2 is fixed to the ON position. Therefore, it is possible to cause the switch SW1 to be controlled in the OFF state. Thus, the switch SW1 is controlled to be in the OFF state even when the switch SW2 is fixed to the ON position. Accordingly, it is possible to prevent excessive electric discharge from the lithium-ion battery 31 to the starter motor 21, making it possible to prevent the electric power fuse 63 from melting and being cut.

In an example implementation described above, the OFF signal may be outputted only to the switch SW1 when the starter button 27 is operated by the occupant. However, this is not limitative. The OFF signal may be outputted only to the switch SW2 when the starter button 27 is operated by the occupant.

The technology is by no means limited to the example implementation described above. Various changes and modifications may be made to any implementation without departing from the scope of the technology. For example, in an example implementation described above, the motor generator 16 may be used as an electric power generator. However, this is not limitative. An alternator may be used as an electric power generator. Furthermore, in an example implementation described above, both the switch control unit 74 and the starter control unit 75 may be provided in the main controller 70. However, this is not limitative. Alternatively, the switch control unit 74 or the starter control unit 75, or both may be provided in another controller.

In the example implementation illustrated in FIG. 7, the OFF signal is outputted to each of the switches SW1 and SW2, following which the ON signal is outputted to the starter relay 28 when the starter button 27 is operated by the occupant. However, this is not limitative. In an alternative example implementation, timing of outputting the OFF signal to each of the switch SW1 and the switch SW2, and timing of outputting the ON signal to the starter relay 28 may be performed at the same time. Alternatively, outputting the ON signal to the starter relay 28 may be performed, following which outputting the OFF signal to each of the switch SW1 and the switch SW2 may be performed. Further, in an alternative example implementation, timing of outputting the OFF signal to the switch SW1 and timing of outputting the OFF signal to the switch SW2 may be performed at the same time, or, alternatively, may differ in time from each other.

Similarly to an example illustrated in FIG. 7, referring to FIG. 11, the OFF signal is outputted to the switch SW1, following which the ON signal is outputted to the starter relay 28 when the starter button 27 is operated by the occupant. However, this is not limitative. In an alternative example implementation, timing of outputting the OFF signal to the switch SW1 and timing of outputting the ON signal to the starter relay 28 may be performed at the same time. Alternatively, outputting the ON signal to the starter relay 28 may be performed, following which outputting the OFF signal to the switch SW1 may be performed.

In an example implementation described above, the starter button 27, serving as the occupant operated unit, is a push-button starter switch that is to be operated by the occupant when starting the operation of the engine 12. However, this is not limitative. For example, a starter switch that is to be twisted by the occupant when starting the operation of the engine 12 may be used as the occupant operated unit. Further, in an example implementation described above, the starter motor 21 may be a movable-type starter motor in which the pinion 25 is caused to project. However, this is not limitative. Alternatively, a constant-mesh-type starter motor may be used in which the pinion 25 is always in mesh with the ring gear 26.

In an example implementation described above, the lithium-ion battery 31 is used as the first electric power storage, and the lead-acid battery 32 is further used as the second electric power storage. However, this is not limitative. Another battery or a capacitor may be used as the first electric power storage and the second electric power storage. Further, different types of electric power storage from each other may be used as the first electric power storage and the second electric power storage. Alternatively, the same type of electric power storages may be used as the first electric power storage and the second electric power storage. Further, in an example implementation described above, the switch SW2 is provided on the positive line 44 of the lithium-ion battery 31. However, this is not limitative. For example, as indicated by an alternate long and short dash line in FIG. 2, the switch SW2 may be provided on the negative line 49 of the lithium-ion battery 31.

The main controller 70 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 70. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 70 illustrated in FIG. 1.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:
1. A vehicle electric power supply apparatus comprising:
a first electric power supply system including an electric power generator being configured to be driven to revolve by an engine of the vehicle, and a first electric power storage being coupled to the electric power generator in parallel;
an electric power fuse coupled with the first electric power supply system;
a second electric power supply system configured to be coupled in parallel with the first electric power supply system via the electric power fuse, the second electric power supply system including a starter motor being configured to start operation of the engine and a second electric power storage having a terminal voltage lower than a terminal voltage of the first electric power storage, and being coupled to the starter motor in parallel;
a switch arranged on a path between the electric power fuse and the first electric power storage included in the first electric power supply system;
a starter relay configured to be coupled with the starter motor in serial;
a detector configured to detect that an occupant starts the operation of the engine; and a controller configured to, when the detector detects that the occupant starts the operation of the engine, 1) turn the switch off to isolate the first electric power supply system from the fuse, and 2) in response to the switch being turned off, turn the starter relay on to couple the starter motor and the second electric power storage to each other.

2. The vehicle electric power supply apparatus according to claim 1, wherein internal resistance of the first electric power storage is smaller than internal resistance of the second electric power storage.

3. A vehicle electric power supply apparatus comprising:
a first electric power supply system including an electric power generator being configured to be driven to revolve by an engine of a vehicle, and a first electric power storage being coupled to the electric power generator in parallel;
an electric power fuse coupled with the first electric power supply system;
a second electric power supply system configured to be coupled in parallel with the first electric power supply system via the electric power fuse, the second electric power supply system including a starter motor being configured to start operation of the engine, and a second electric power storage having a terminal voltage lower than a terminal voltage of the first electric power storage, and being coupled to the starter motor in parallel;
a switch arranged on a path between the electric power fuse and the first electric power storage included in the first electric power supply system;
a starter relay configured to be coupled with the starter motor in serial;
a detector configured to detect that an occupant starts the operation of the engine; and
circuitry configured to, when the detector detects that the occupant starts the operation of the engine, 1) turn the switch off to isolate the first electric power supply system from the fuse, and 2) in response to the switch being turned off, turn the starter relay on to couple the starter motor and the second electric power storage to each other.

4. The vehicle electric power supply apparatus according to claim 1,
wherein the second electric power supply system further includes an electrical device of the vehicle, the electrical device and the starter motor being configured to be coupled in parallel with the second electric power storage, and
wherein the second electric power supply system is configured to be coupled in parallel with the first electric power supply system via the switch and is configured to disconnected from the first electric power supply system by the switch.

5. A vehicle electric power supply apparatus comprising:
a first electric power supply system including an electric power generator and a first electric power storage, the electric power generator being configured to be driven to revolve by an engine of the vehicle, the first electric power storage being coupled to the electric power generator;
a second electric power supply system configured to be coupled in parallel with the first electric power supply system, the second electric power supply system including a starter motor and a second electric power storage, the starter motor being configured to start operation of the engine, the second electric power storage being coupled to the starter motor;
an electric power fuse provided on an electrically-conducting path, the electrically-conducting path being configured to couple the first electric power storage and the second electric power storage to each other, the electrically-conducting path being coupled, via a node, to a line that is coupled to a positive terminal of the electric power generator;
a first switch and a second switch provided on the electrically-conducting path such that 1) the first switch and the second switch are disposed between the first power storage and the electric power fuse and 2) the node is disposed between the first switch and the second switch such that i) the first switch is disposed between the node and the electric power fuse and ii) the second switch is disposed between the node and the first electric power storage, each of the first switch and the second switch being configured to be controlled in one of an electrically-conductive state and a cutoff state;
a starter relay configured to be controlled in one of an electrically-conductive state and a cutoff state, the electrically-conductive state being a state in which the starter motor and the second electric power storage are coupled to each other, the cutoff state being a state in which the starter motor and the second electric power storage are isolated from each other;
a detector configured to detect that an occupant starts the operation of the engine; and
a controller configured to:
when the detector detects that the occupant starts the operation of the engine, isolate the first electric power supply system from the fuse by setting the first switch to the electrically-conductive state and the second switch to the cutoff state; and
in response to isolating the first electric power supply system from the fuse by setting the first switch to the electrically-conductive state and the second switch to the cutoff state, switch the starter relay from the cutoff state to the electrically-conductive state to couple the starter motor and the second electric power storage to each other.

* * * * *